United States Patent

Hayashi et al.

Patent Number: 6,097,501
Date of Patent: Aug. 1, 2000

[54] COLOR CORRECTION DEVICE

[75] Inventors: Shuji Hayashi; Haruo Yamamoto; Koji Nakamura, all of Osaka, Japan

[73] Assignee: Kyocera Mita Corporation, Osaka, Japan

[21] Appl. No.: 08/678,928

[22] Filed: Jul. 12, 1996

[30] Foreign Application Priority Data

Jul. 18, 1995 [JP] Japan ................................. 7-181945

[51] Int. Cl.$^7$ ................ H04N 1/50; H04N 1/60
[52] U.S. Cl. ............................ 358/1.9; 358/521
[58] Field of Search ................ 382/167; 358/515, 358/517, 518, 520, 521, 523, 1.9

[56] References Cited

U.S. PATENT DOCUMENTS 4,989,079  1/1991  Ito ............................. 358/520
5,592,311  1/1997  Hibi ........................... 358/518

*Primary Examiner*—Scott Rogers
*Attorney, Agent, or Firm*—Jordan and Hamburg LLP

[57] ABSTRACT

A color correcting device for applying a color correction to an image data made up of color components of three primary colors and read by a color image reader means, the device includes: an image data extractor for extracting an image data of a predetermined color to be corrected based on a density balance of the respective color components of three primary colors, and a corrector for correcting a density level of a specified color component set in advance in correspondence with the color to be corrected, out of the color components of the extracted image data, to a predetermined density level.

43 Claims, 9 Drawing Sheets

COLOR CORRECTION DEVICE

BACKGROUND OF THE INVENTION

The present invention relates to a color correction device for applying a color correction to a color image read by an image reading apparatus such as a color scanner.

There is known a color copier for reading an original image by a color scanner including a color CCD (charge coupled device) and forming a color image on a copy sheet based on the read image data.

In such a color copier, the read image is output as image data of three primary colors of R (red), G (green) and B (blue) from the color scanner. The image data of three primary colors are converted into image data of their complementary colors of C (cyan), M (magenta) and Y (yellow), and are then subjected to color corrections defined by masking equations shown in equations (1):

$$D_C = A_{11} \cdot D_C + A_{12} \cdot D_M + A_{13} \cdot D_Y$$

$$D_M = A_{21} \cdot D_C + A_{22} \cdot D_M + A_{23} \cdot D_Y$$

$$D_Y = A_{31} \cdot D_C + A_{32} \cdot D_M + A_{33} \cdot D_Y \qquad (1).$$

The above color corrections are performed to improve color reproducibility of the color image formed on the copy sheet by correcting lacking and/or unnecessary color components according to actual spectral characteristics of toners since toners of C, M, Y do not have ideal spectral characteristics.

The color correction in accordance with the masking equations (1) is briefly described taking a color of magenta as an example.

Figure 9:
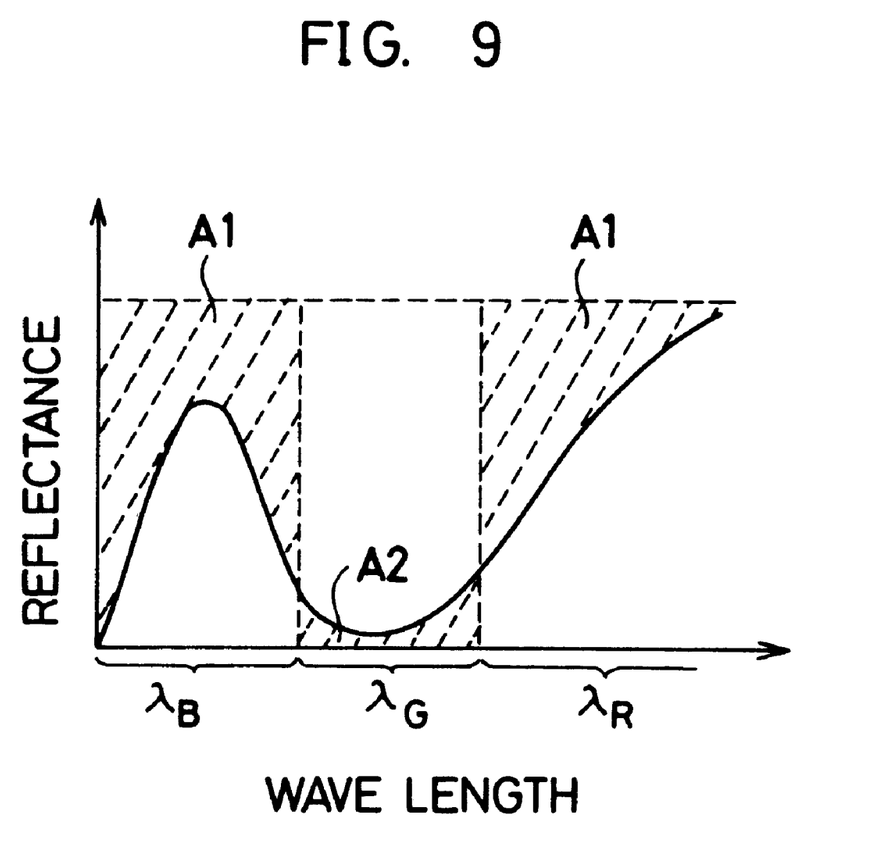
FIG. 9 is a graph showing an exemplary spectral characteristic of a magenta toner.

FIG. 9 is a graph showing an example of the spectral characteristic of the magenta toner. In the case that the magenta toner has an ideal spectral characteristic, all rays in a bleu wavelength region $\lambda$ B and a red wavelength region $\lambda$ R are reflected, and rays in a green wavelength region $\lambda$ G are completely absorbed as shown in dotted lines in FIG. 9. However, the spectral characteristic of the actual magenta toner is one wherein: the rays in the blue wavelength region $\lambda$ B and the red wavelength region $\lambda$ R are partially absorbed and the rays in the green wavelength region $\lambda$ G are partially reflected.

Accordingly, even if the input image data is pure magenta, the color of magenta image formed on the copy sheet may lack components in the blue wavelength region $\lambda$ B and the red wavelength region $\lambda$ R (components in a region A1 of FIG. 9) and may have redundant components in the green wavelength region $\lambda$ G (components in a region A2 of FIG. 9). Thus, pure magenta cannot be reproduced.

In view of this, the input image data of C-, M-, Y-components are corrected so that the color of the magenta image formed on the copy sheet maximally contains color components of pure magenta. This correction is applied to compensate for the lacking components in the blue wavelength region $\lambda$ B and the red wavelength region $\lambda$ R and to reduce the redundant components in the green wavelength region $\lambda$ G by mixing the image data of C-, M-, Y-components at a specified ratio. Mathematically, this correction is generally expressed by the above masking equations.

It should be appreciated that the correction coefficients $A_{ij}$(i=1, 2, 3, j=1, 2, 3) of the masking equations are theoretically or empirically set according to the spectral characteristics of the toners and of the color filters of the color scanner.

In the above color copier, in order to make a black reproducibility of gray satisfactory, a color correction called UCR (under color reduction) is applied.

Figure 10A:
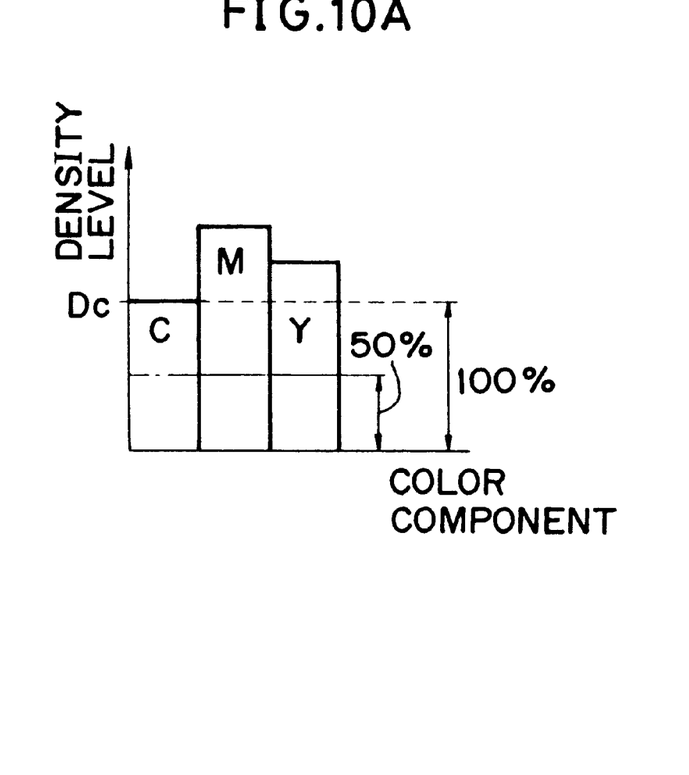
FIGS. 10A and 10B are charts showing spectral characteristics of an image used for the explanation of a UCR.
Figure 10B:
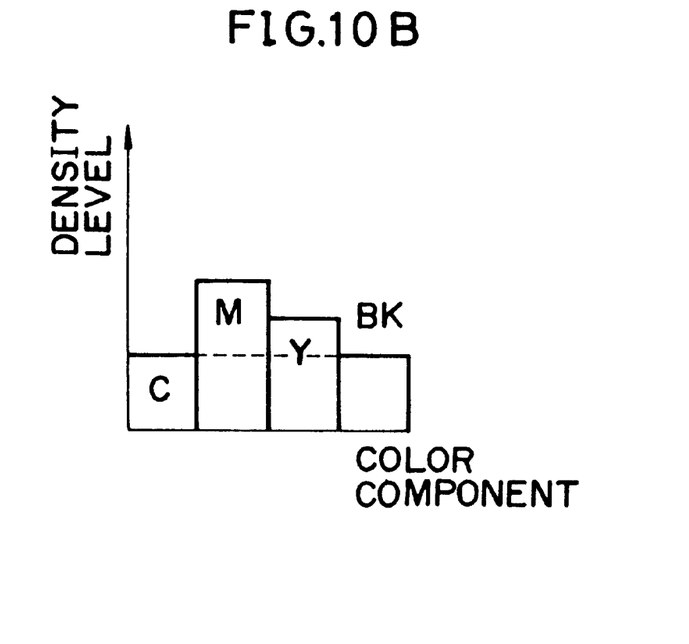

The UCR is such that, as shown in FIGS. 10A and 10B, a density level corresponding substantially to the half of the minimum density level of the image data of C-, M-, Y-components (hereinafter, "correction level") is subtracted from the respective density levels of the image data of C-, M-, Y-components, an image data of black (BK) components having this correction level is generated, and the generated image data of BK-components is added to the image data of C-, M- and Y-components.

In the example of FIGS. 10A and 10B, since the density level DC of the image data of C-components is at minimum, the density levels $D_C$, $D_M$, $D_Y$ of the image data of C-, M- and Y-components are corrected to $D_C$ ($=D_C-D_C/2$), $D_M$ ($=D_M-D_C/2$), $D_Y$, ($D_Y-D_C/2$), respectively, and then the image data of the BK-components having the same density level as $D_C/2$ is added to the image data of C-, M-, Y-components.

The known color correction in accordance with the masking equations is applied to correct the color deviations caused by the spectral characteristics of the actual toners and output gradation characteristics, but not to correct color deviations caused by the spectral characteristics of the color filters of the color scanner. Thus, in the case that the color deviation occurs while the image data is read by the color scanner, the color correction in accordance with the masking equations is applied based on the image data of C-, M-, Y-components having experienced the color deviations. Therefore, the colors of the color image formed on the copy sheet is different from the colors of the original image.

Particularly, since unnecessary color components are included in the image data read by the color scanner, if a masking correction is performed based on the read image data of C-, M-, Y-components (or R-, G-, B-components), unnecessary color components are unnecessarily added depending upon the color. As a result, the saturation of colors formed on the recording sheet is lower than that of the colors of the original, thereby giving a sense of incongruity in terms of color reproducibility.

Figure 11:
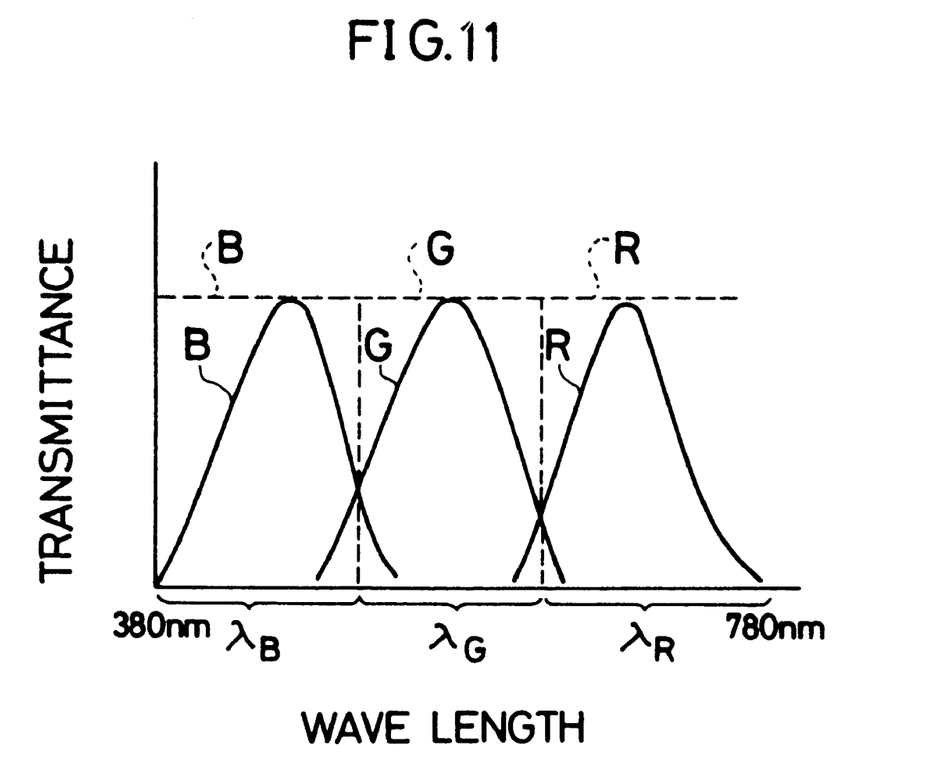
FIG. 11 is a graph showing exemplary spectral characteristics of R-, G-, B-color filters adopted in a color scanner.

This undesirable color reproducibility is described in detail, taking pure blue as an example. Color filters of RGB color specification system adopted in color scanners generally have spectral characteristics as shown in FIG. 11, the spectral characteristic of each color filter has a wider range of transmission than an ideal spectral characteristic (indicated by dotted line in FIG. 11), and a bottom portion thereof spread into the neighboring color regions. Thus, strictly speaking, the image data read by the color scanner has spectral characteristics different from those of the colors of the original.

In the case that a pure blue original image is read by the color scanner, if the color filters are ideal, B-components are output at high values from the color scanner while no G- and R-components are output therefrom. However, in reality, B-components are output at low values. Thus, if the image data of R-, G-, B-components output from the color scanner are converted into image data of C-, M-, Y-components, it results in many unnecessary Y-components in addition to C- and M-components.

Since an ideal blue image data does not include the image data of Y-components, if the color correction is performed in accordance with the masking equations (1), there can be obtained an image data of Y-components having a suitable density level $D_Y$. However, if the blue image data includes unnecessary Y-components, the density level $D_Y$, of the image data after the color correction is higher than a suitable value. As a result, the saturation of a blue toner image is reduced as compared to the original color, making it darker.

In order to improve the disadvantage in terms of the blue color reproducibility, it may be possible to set the correction coefficients $A_{ij}$ so as to suppress the conversion value $D_Y$, of the image data of Y-components in the masking equations. However, this makes, for example, the conversion value $D_Y$, of the image data of Y-components of pure green smaller than necessary, causing a disadvantageous green color reproducibility.

Accordingly, it is difficult to correct the color deviations of the image read by the color scanner only by the color correction in accordance with the masking equations.

In a γ-correction, a γ conversion value of low density black is generally suppressed so as not to make an image as a whole dark. A γ conversion value of gray is suppressed since the density levels of C-, M-, Y-components are reduced by the UCR. Thus, if the color correction in accordance with the masking equations is applied to gray in a similar manner as it is applied to the chromatic colors, the density level of gray becomes higher than a suitable value, thereby making the reproduced gray lighter than the original gray which is a disadvantage of color reproducibility peculiar to gray.

SUMMARY OF THE INVENTION

It is an object of the present invention to provide a color correcting device which has overcome the problems residing in the prior art.

It is another object of the present invention to provide a color correcting device which can correct color deviations of an image read by a color scanner and a color deviation peculiar to gray, thereby improving color reproducibility of the output image.

The invention is directed to a color correcting device for applying a color correction to image data made up of color components of three primary colors and read by a color image reader means so as to correct a color deviation caused by the spectral characteristics of the color image reader means, comprising image data extraction means for extracting an image data of a predetermined color to be corrected based on a density balance of the respective color components of three primary colors, and correction means for correcting a density level of a specified color component set in advance in correspondence with the color to be corrected, out of the color components of the extracted image data, to a predetermined density level.

The color correcting device thus constructed uses the image data made up of the color components of three primary colors and read by the color image reader means. The image data having an improper density balance is corrected such that its density balance lies within a specified density balance range. Accordingly, the color deviations during the image reading operation which are caused by the spectral characteristics of the color image reader means are suitably corrected, with the result that the image data can be reproduced with an improved color reproducibility.

There may further provided storage means for storing correction coefficients set in advance for each color to be corrected, and the correction means may correct the density by multiplying the density level of the specified color components of the color to be corrected by the correction coefficients.

Such a construction allows the density level of the color component to be corrected can be easily corrected.

The image data extraction means may extract a blue image data from the cyan, magenta and yellow components read by the color image reader means, and the correction means may reduce the density level of yellow components of the blue image data to a predetermined density level. In this way, the color deviations of bluish colors are properly corrected.

The image data extraction means may extract a yellow image data from the cyan, magenta and yellow components read by the color image reader means, and the correction means may increase the density level of magenta components of the yellow image data to a predetermined density level. In this way, the color deviations of yellowish colors are properly corrected.

The image data extraction means may extract a green image data from the cyan, magenta and yellow color components read by the color image reader means, and the correction means may increase the density level of magenta components of the green image data to a predetermined density level. In this way, the color deviations of greenish colors are can be properly corrected.

The image data extraction means may extract a cyan image data from the cyan, magenta and yellow components read by the color image reader means, and the correction means may reduce the density level of magenta components of the cyan image data to a predetermined density level. In this way, the color deviations of bluish colors are properly corrected.

The image data extraction means extracts a cyan image data from the cyan, magenta and yellow components read by the color image reader means, and the correction means may increase the density level of yellow components of the cyan image data to a predetermined density level. In this way, the color deviations of bluish colors are properly corrected.

The invention is also directed to a color correcting device for applying a color correction in accordance with specified masking equations to image data made up of color components of three primary colors and read by a color image reader means, comprising: storage means for storing first masking equations having first correction coefficients for gray and second masking equations having second correction coefficients for gray, color discrimination means for discriminating based on the density balance of the respective color components of three primary colors whether the color of the image data is gray, and color correction control means for applying the color correction in accordance with the first masking equations to the image data if the discriminated color is gray while applying the color correction in accordance with the second masking equations to the image data unless the discriminated color is gray.

The color correcting device thus constructed uses out of the image data made up of the color components of three primary colors and read by the color image reader means and the color correction is applied to the gray image data in accordance with the masking equations specifically defined for gray. As a result, the image data can be reproduced with an improved gray color reproducibility.

These and other objects, features and advantages of the present invention will become more apparent upon a reading of the following detailed description and accompanying drawings.

DETAILED DESCRIPTION OF THE INVENTION

Figure 1:
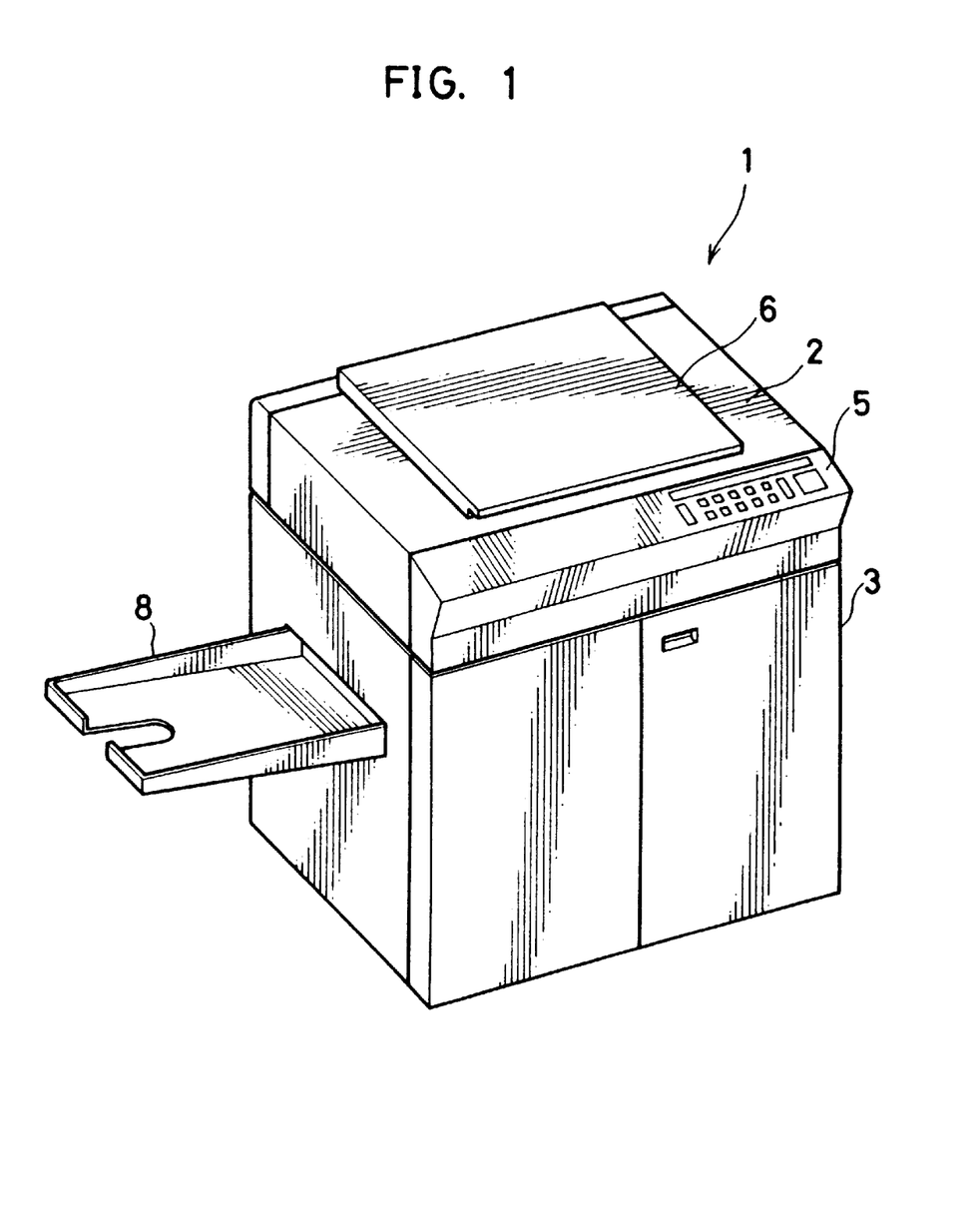
FIG. 1 is a perspective view of a color copier provided with a color correction device according to the invention.
Figure 2:
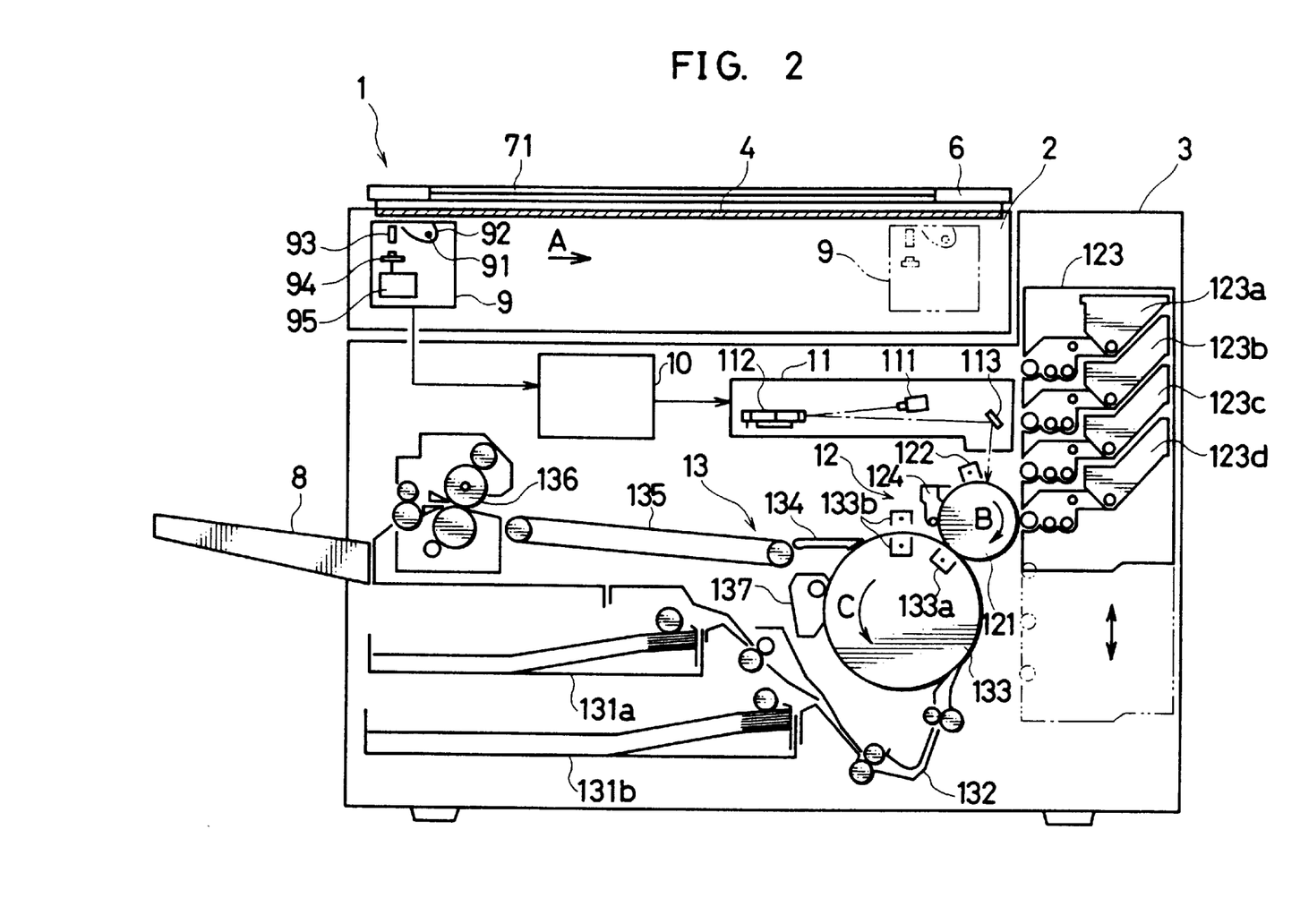
FIG. 2 is a diagram showing the interior construction of the color copier.

FIG. 1 is a perspective view of a color copier provided with a color correction device according to the invention, and FIG. 2 is a diagram showing the interior construction of the color copier.

A color copier 1 includes a scanner 2 for reading a color original image and a printer 3 for forming a color image on a copy sheet based on the image data read by the scanner 2.

The scanner 2 is arranged at the top of a main body of the color copier 1, and the printer 3 is arranged below the scanner 2. On the upper surface of the scanner 2, there are provided a platen glass 4 on which an original is set and an operation panel 5. An original holder 6 is openably and closably provided on the top of the platen glass 4. Operation switches 5 used in connection with a copying operation including a copy key, ten number entry keys, a clear key and a density adjustment key are provided in the operation panel 5.

Below the platen glass 4, an image reader 9 is provided, capable of reciprocating along a direction A (see FIG. 2) between a home position to a rear end position of a maximum original size. The image reader 9 includes an illumination lamp 91 for illuminating the original placed on the platen glass 4, a reflector 92, a self focusing lens (or SELFOC lens) 93 for focusing the light reflected by the original on an image pickup device 94, the image pickup device 94 including a CCD color line sensor and the like for reading the focused original image, and a converter circuit 95 for converting the image data of R-, G-, B-components read by the image pickup device (hereinafter, "CCD 94") into image data of C-, M-, Y-components.

The CCD 94 includes color filters of R, G, B for the respective pixels, separates the image at the same pixel position into image signals (analog signals) of R-, G- and B-components and outputs the same. The converter circuit 95 converts the analog image signals of R, G, B into digital signals, converts these digital signals into image data of C, M, Y which are primary colors of a subtractive color process, and outputs the same.

The image data of R-, G-, B-components are converted into image data of C-, M-, Y-components as follows:

$$C=(1-Ri/R0)$$
$$M=(1-Gi/G0)$$
$$Y=(1-Bi/B0) \qquad (2)$$

wherein.

C, M, Y: normalized density (gradation) levels of the three primary colors of the subtractive color process;

Ri,Gi,Bi: read density (gradation) levels of the three primary colors of the additive color process;

R0,G0,B0: maximum density (gradation) levels after the A/D conversion.

For example, in the case that the image data includes a 8-bit data, an image density is expressed in resolving power of 256 gradations. Since the maximum density levels R0, G0, B0 are 255, the image data of C-, M-, Y-components are C=(1-Ri/255), M=(1-Gi/255), Y=(1-Bi/255), respectively.

The image reader 9 reads the original image line by line while moving from the home position to the rear end position of the original size. The image signals obtained by the image reader 9 are converted into the image data of C-, M-, Y-components as described above, and are sent to an image processing unit 10 provided in the printer 3.

The printer 3 includes the image processing unit 10, an exposing device 11 for exposing a photosensitive drum 121 to form a latent image of the original image, an imaging assembly 12 for forming a color image of the original image on a copy sheet, and a sheet transport assembly 13 for feeding the copy sheet to the imaging assembly 12 and discharging the copy sheet bearing the formed color image, and a discharge tray 9 for receiving the discharged copy sheet.

The exposing device 11 includes a laser emitter 111 for emitting a laser beam modulated by the image data, a polygonal mirror 112 for causing the laser beam to scan the surface of the photosensitive drum 121 in an axial direction, and a mirror 113 for introducing the laser beam to the photosensitive drum 121.

The imaging assembly 12 includes the photosensitive drum 121 for forming a latent image of the original image and a color developed image, a charging device 122 for charging the photosensitive drum 121, a developing unit 123 for developing the latent image formed on the photosensitive drum 121, and a cleaning device 124 for removing unnecessary toner remaining on the photosensitive drum 121. The charging device 122, the developing unit 123 and the cleaning device 124 are arranged around the photosensitive drum 121. Downstream from the developing unit 123 is arranged a transfer drum 133 which is brought into contact with the surface of the photosensitive drum 121 to feed the copy sheet.

The photosensitive drum 121 is driven to rotate in a direction of arrow B at a specified speed when the latent image and/or the developed image are formed on the surface thereof. On the other hand, the transfer drum 133 is driven to rotate in a direction of arrow C in synchronism with the rotation of the photosensitive drum 121. At this time, the rotation control is such that the peripheral speed of the transfer drum 133 and that of the photosensitive drum 121 are same.

The developing unit 123 includes four developing devices 123a to 123d arranged in a number of stages along the vertical direction and movable upward and downward as a single unit. Cyan, magenta, yellow and black toners are contained in the respective developing devices 123a to 123d in this order from the top. Each of the developing devices 123a to 123d can be brought into contact with the surface of the photosensitive drum 121 in a specified developing position defined in the vertical direction. The latent image formed on the photosensitive drum 121 is developed by successively moving the respective developing devices 123a to 123d upward or downward to the developing position and by forming the toner images in the order of cyan, magenta, yellow and black.

The sheet transport assembly 13 includes sheet cassettes 131a, 131b for containing copy sheets which are disposed in a lower part of the printer 3, a guide mechanism 132 for guiding the copy sheet fed from the cassette 131a or 131b to the transfer drum 133, a separation claw 134 for separating the copy sheet electrostatically attracted to the surface of the transfer drum 133, a transport mechanism 135 for transporting the separated copy sheet to a fixing device 136, and the fixing device 136 for fixing the formed toner image to the copy sheet.

A transfer device 133a for transferring the toner image formed on the photosensitive drum 121 to the copy sheet by corona discharge is built in the transfer drum 133. Further, a pair of separation chargers 133b for separating the copy sheet from the transfer drum 133 by corona discharge are opposed to each other inside and outside the transfer drum 133 downstream from the transfer device 133a along the rotating direction of the transfer drum 133. The separation claw 134 is disposed downstream from the separation chargers 133b.

A cleaning device 137 for cleaning the surface of the transfer drum 133 after the copy sheet is separated is disposed around the transfer drum 133 and downstream from the separation claw 134.

In the above construction, the image data of R-. G-. B-components read by the scanner 2 are output to the image processing unit 10 after being converted into the image data of C-, M-, Y-components. A specified image signal processing is applied to the converted image data in the image processing unit 10. During the image signal processing, an image data of BK (black) is generated, and the image data of C, M, Y and BK are successively output from the image processing unit 10 to the printer 3, and a color image is formed on the copy sheet based on the image data of the respective colors.

The color image is formed by transferring four toner images of C, M, Y and BK to the copy sheet, i.e. by performing the image transfer four times. Specifically, the laser beam modulated by the image data of C-components is first emitted from the exposing device 11 onto the photosensitive drum 121 charged at a specified potential by the charging device 122 to form a latent image of C-components of the original image. The laser beam is emitted while scanning the surface of the photosensitive drum 121 in a raster direction in synchronism with the peripheral speed of the photosensitive drum 121, thereby forming the latent image.

The latent image formed on the photosensitive drum 121 is rotated to the developing position, where cyan toner is electrostatically attracted to the latent image by the developing device 123a of the developing unit 123 to develop the same. The thus developed toner image is rotated to an imaging position, where it is pressed against the fed copy sheet and the image of C-components of the original image are transferred and formed on the copy sheet.

After having its surface cleaned by the cleaning device 124, the photosensitive drum 121 is charged again at the specified potential by the charging device 122 and the latent image of M-components of the original image is developed with magenta toner in a manner similar to the above. This magenta toner image is transferred and formed on the copy sheet fed again to the transfer position by the transfer drum 133 without being separated.

After toner images of Y- and BK-components of the original image are transferred and formed in succession on the copy sheet in similar manners, the formation of the color image is completed. The copy sheet attracted to the transfer drum 133 is separated therefrom by the separation claw 134, transported to the fixing device 136 by the transport mechanism 135, and discharged onto the discharge tray 8 after having the transfer red toner images fixed thereto.

Figure 3:
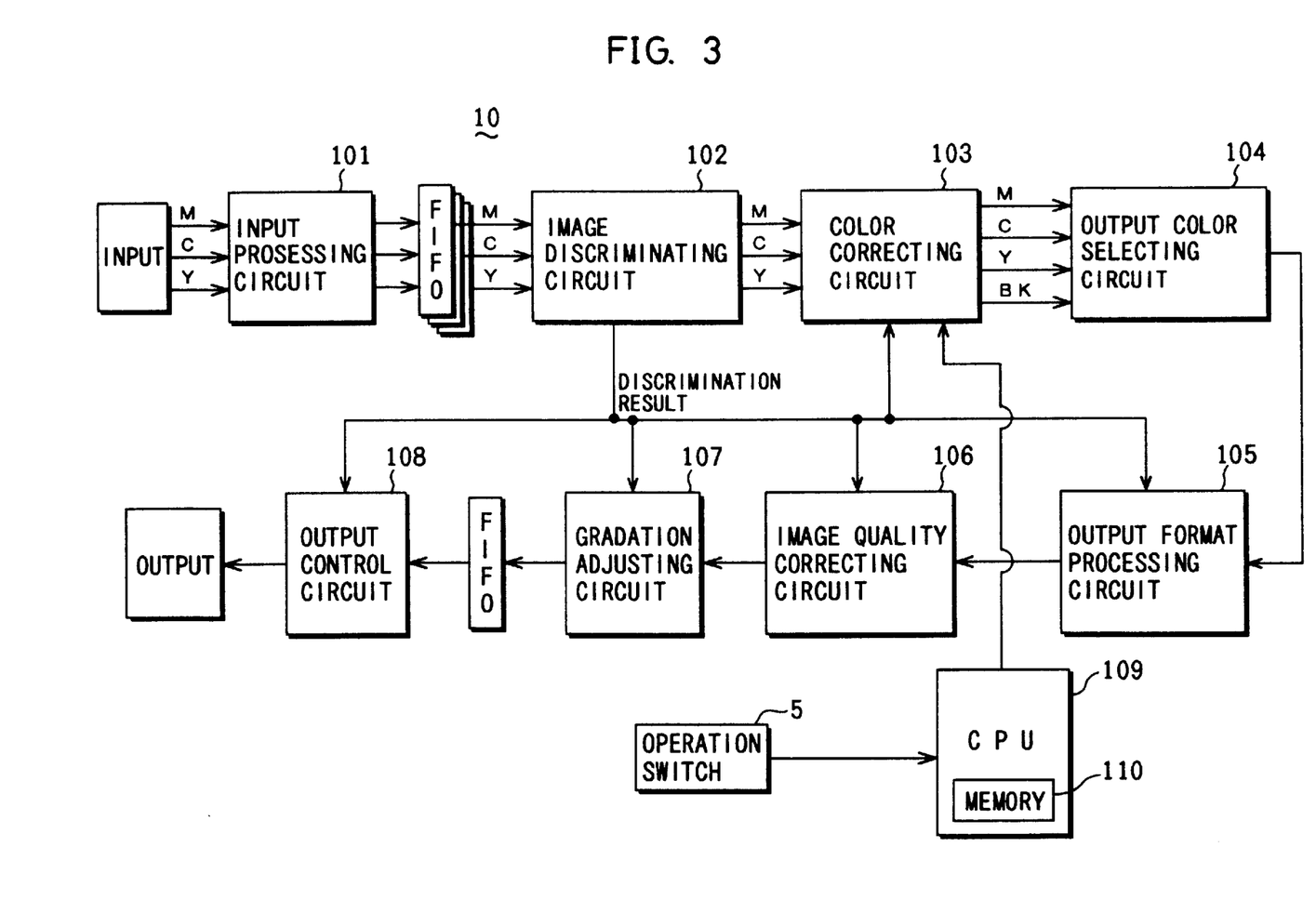
FIG. 3 is a basic block construction diagram of an image processing unit.

FIG. 3 is a basic block construction diagram of the image processing unit 10.

The image processing unit 10 includes an input processing circuit 101, an image discriminating circuit 102, a color correcting circuit 103, an output color selecting circuit 104, an output format processing circuit 105, an image quality correcting circuit 106, a gradation adjusting circuit 107, an output control circuit 108 and a control circuit 109 (identified by CPU in FIG. 3) having a memory 110. The image data of C-, M-, Y-components at the respective pixel positions are input to the image processing unit 10 in a parallel manner, and the image processing is performed in a parallel manner until a color correction to be described later is completed.

The input processing circuit 101 is adapted to adjust the imaging position in the copy sheet and discriminate whether the image to be formed is a color image or a monochromatic image. The input processing circuit 101 cuts off the image data at the edges of the original to prevent an image from being formed on the edges of the copy sheet, and adjusts the imaging position of the input image in the copy sheet. The input processing circuit 101 also discriminates whether the input image is a color image or a monochromatic image based on the signal levels of the image data of C-, M-. Y-components.

The image discriminating circuit 102 is adapted to discriminate a character image area, a pictorial image area, and a dot image area of the input image. This circuit 102 makes the above discrimination based on the signal levels of the array of the respective image data forming the image. For example, if a certain area consists essentially of binary signals, this area is discriminated to be a character image area. If a certain area consists essentially of gradation level signals, this area is discriminated to be a pictorial image area. Further, if an image signal of the same level is repeated in a specified cycle, the area is discriminated to be a dot image area.

The color correcting circuit 103 applies a color correction to the image data of C-, M-, Y-components in view of the spectral characteristics of the color filters of the CCD 94 and those of the color toners of C, M, Y, extracts black pixel positions from the image data of C-, M-, Y-components and generates the image data of BK in those pixel positions. The circuit 103 constitutes the image data extraction means and the correction means according to the invention.

The color correcting circuit 103 is provided with a memory (storage means) 103A including a ROM (read only memory) for storing correction coefficients $A_{ij}$ of the masking equations. The correction coefficients $A_{ij}$ are set at different values, as shown in TABLE-1 below, depending upon the density levels of C-, M-, Y-components.

TABLE 1

| | DENSITY LEVEL | $A_{i1}$ | $A_{i2}$ | $A_{i3}$ |
|---|---|---|---|---|
| C | 0–100 | 0.53 | −0.20 | 0.12 |
| ($A_{1j}$) | 101–150 | 0.85 | −0.26 | 0.00 |
| | 151–190 | 0.95 | −0.23 | 0.01 |
| | 191–255 | 0.99 | −0.20 | 0.03 |
| M | 0–100 | −0.08 | 0.77 | −0.12 |
| ($A_{2j}$) | 101–150 | −0.10 | 0.80 | −0.15 |
| | 151–190 | −0.15 | 0.92 | −0.20 |
| | 191–255 | −0.18 | 1.00 | −0.20 |
| Y | 0–100 | −0.10 | 0.03 | 0.47 |
| ($A_{3j}$) | 101–150 | −0.15 | 0.13 | 0.80 |
| | 151–190 | −0.10 | 0.10 | 0.98 |
| | 191–255 | −0.05 | 0.10 | 1.03 |

The image data of C-, M-, Y-components expressed in 256 gradations are divided into four density levels using "100", "150" and "190" as boundary values. In response to the density levels of the input image data of the respective color components, the corresponding correction coefficients ($A_{11}$, $A_{12}$, $A_{13}$), ($A_{21}$, $A_{22}$, $A_{23}$), ($A_{31}$, $A_{32}$, $A_{33}$) are selectively set. For example, if any of the density levels of the image data of C-, M-, Y-components lies within the range (0–100), the correction coefficients $A_{1j}$, $A_{2j}$, $A_{3j}$ (j=1,2,3) are: $A_{1j}$=(0.53, −0.2, 0.12), $A_{2j}$=(−0.08, 0.77, −0.12), $A_{3j}$=(−0.10, 0.03, 0.47). Accordingly, the masking equations are written as in equations (3):

$$D_C = 0.53 \cdot D_C - 0.08 \cdot D_M - 0.10 \cdot D_Y$$

$$D_M = 0.20 \cdot D_C + 0.77 \cdot D_M + 0.03 \cdot D_Y$$

$$D_Y = 0.12 \cdot D_C - 0.12 \cdot D_M + 0.47 \cdot D_Y \quad (3)$$

The output color selecting circuit 104 is adapted to serially output the image data of the respective colors of C, M, Y, BK parallelly input from the color correcting circuit 103 in the order of C, M, Y, BK.

The output format processing circuit 105 is adapted to process the image data of C-, M-, Y-, BK-components in accordance with an output format such as a mirror image, a zooming, or a movement which is set by the operation switch 5.

The image quality correcting circuit 106 is adapted to correct the quality of the image formed on the copy sheet. For example, in the case that the outline of the input image is unclear due to a resolving power of the scanner 2, an outline correction is performed to make the image clear. Further, in the case that the input image seems to be hard, the correction is performed to soften the output image.

The gradation adjusting circuit 107 is adapted to correct the gradations of the image data of C-, M-, Y-, BK-components. The output control circuit 108 is adapted to generate an emission control signal to be output to the laser emitter 111. This circuit 108 generates a control signal obtained by PWM-modulating a reference clock by the image data, and outputs this control signal to the exposing device 11.

The control circuit 109 includes a microcomputer and centrally controls the operation of the circuits 101 to 108. This circuit 109 constitutes a color discrimination means and a color correction control means according to the invention.

Next, the color correction performed in the color correcting circuit 103 is described.

The color correction includes a first color correction for discriminating the color (hue) in each pixel position based on the density balance of the image data of C-, M-, Y-components and for correcting the density balance of the image data of C-, M-, Y-components into a suitable density balance of that color, and a second color correction for correcting the image data of C-, M-, Y-components after the first color correction in accordance with the preset masking equations.

The first color correction is performed to correct the color deviation for each unsuitable color which occurred during the image reading operation, caused by the spectral characteristics of the color filters of the CCD 94. The second color correction is performed to collectively correct the color deviations which occurs during the image formation, caused by the spectral characteristics of the actually used color toners of C, M and Y.

The second color correction is performed in the known manner.

TABLE-2 shows examples of the first color correction for correcting the color deviations which occur for specific colors due to the spectral characteristics of the color scanner.

TABLE 2

| No. | Cause of Color Deviation | Contents of Correction | Extraction Discrimination Criteria | Contents of Processing |
|---|---|---|---|---|
| 1 | There are many Y-components in B-colors, so it is difficult to adjust B-color | Reduce Y-components in B-color | $D_Y/D_M < 0.5$ & $D_Y/D_C < 0.5$ | $0.4 \cdot D_Y$ |
| 2 | There are few Y-components in C-colors, so it is difficult to adjust C-color | Reduce M-components in C-color Increase Y-components in C-color | $D_M/D_Y < 0.6$ $D_Y/D_C < 0.6$ | $0.3 \cdot D_M$ $1.4 \cdot D_Y$ |
| 3 | There are few M-components in Y-colors, so it is difficult to adjust Y-color | Increase M-components in Y-color | $D_M/D_C < 0.7$ & $D_C/D_Y < 0.1$ | $1.4 \cdot D_M$ |
| 4 | There are few M-components in G-colors, so it is difficult to adjust the saturation of G-color and to eliminate a color difference | Increase M-components in G-color | $D_M/D_C < 0.4$ & $D_M/D_Y < 0.4$ | $1.4 \cdot D_M$ |

In TABLE-2, "Cause of Color Deviation" denotes a cause of the color deviation for a specific color due to the spectral characteristics of the color scanner. "Contents of Correction" denotes the contents of color correction performed to correct the respective color deviations. "Extraction Discrimination Criteria" and "Contents of Processing" denote specific contents of processing applied during the color correction. "Extraction Discrimination Criteria" denotes discrimination criteria used to extract the color to be corrected based on the density levels $D_C$, $D_M$, $D_Y$ of the image data of C-, M-, Y-components. "Contents of Processing" denotes a correction value for the density level of the image data of a specific color component of the extracted color.

As shown in TABLE-2, for a plurality of colors, there are color corrections corresponding to the peculiar causes of the color deviations. However, since the first color correction is performed to extract the color to be corrected (color which requires a correction of the color deviation caused by the spectral characteristics of the color scanner) from the image data and to correct the balance of the color components of the extracted color to a predetermined balance the first color correction is basically identical for each color. More specifically, in the first color correction, it is discriminated whether a certain color is a color to be corrected based on the density levels $D_C$, $D_M$, $D_Y$ of the respective C-, M-, Y-components. If this color is a color to be corrected, the density level of a specified color component set in advance for that color is changed to a predetermined density level.

Accordingly, the first color correction is described with respect to the examples No. 1 and No. 3 of TABLE-2. First, the color deviation correction of B-colors of the example No. 1 is described.

Figure 4:
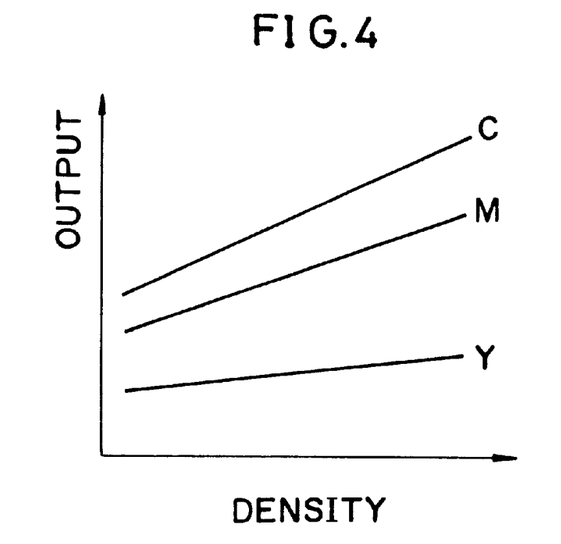
FIG. 4 is a graph showing exemplary output characteristics of C-, M-, Y-components of an image data obtained by reading a pure blue image by a color scanner.

FIG. 4 is a graph showing exemplary output characteristics of C-, M-, Y-components of the image data obtained by reading a pure blue image by the color scanner.

In FIG. 4, a vertical axis represents the signal level of the image data output from the scanner 2, and a horizontal axis represents the density of an original image. Curves C, M, Y denote output characteristics of color components: cyan, magenta and yellow, respectively.

If the RGB color filters of the CCD 94 have ideal spectral characteristics, the image data made up of C-, M-, Y-components and obtained by reading the blue image does not include Y-components. However, since the RGB color filters actually used have the spectral characteristics as shown in FIGS. 10A and 10B, the image data made up of C-, M-, Y-components and obtained by reading the blue image includes unnecessary Y-components as shown in FIG. 4.

Thus, if the color correction is performed in accordance with the masking equations (1) using the input image data of C-, M-, Y-components, a yellow image data $D_Y$, is generated by adding the input unnecessary Y-components to the Y-components included in cyan and magenta. Accordingly, the density of the image data $D_Y$, becomes higher than a proper value, and the lightness of blue of the color image formed based on the density data $D_C$, $D_M$, $D_Y$ of the C-, M-, Y-components is reduced, making the reproduced blue darker than the blue of the original.

Figure 5:
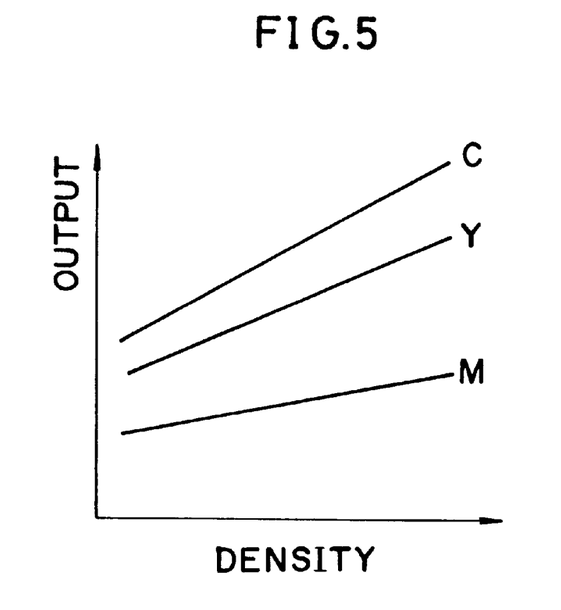
FIG. 5 is a graph showing exemplary output characteristics of C-, M-, Y-components of an image data obtained by reading a pure green image by a color scanner.

In order to solve this disadvantage of color reproduction, a correction may be performed to obtain ideal blue components by removing the input Y-components. However, this causes a disadvantage that the color reproducibility for the other colors deteriorates in the masking. For example, the proportion of the Y-components is high in the output characteristics of the image data made up of C-, M-, Y-components and obtained by reading a pure green image by the color scanner. If a correction is performed to remove the input Y-components as in the case of blue, the image formed on the copy sheet lacks Y-components, with the result that the pure green image cannot be reproduced.

Accordingly, in this embodiment, in the first color correction, it is discriminated, based on the density balance of the input image data of C-, M-, Y-components, whether the color is pure blue. If the color is discriminated to be pure blue, the density of the Y-components is reduced by multiplying the input image data of Y-components by a predetermined correction coefficient. Then, the second color correction is performed by applying masking to the corrected image data of Y-components and the input image data of C- and M-components in accordance with the masking equations.

Figure 6:
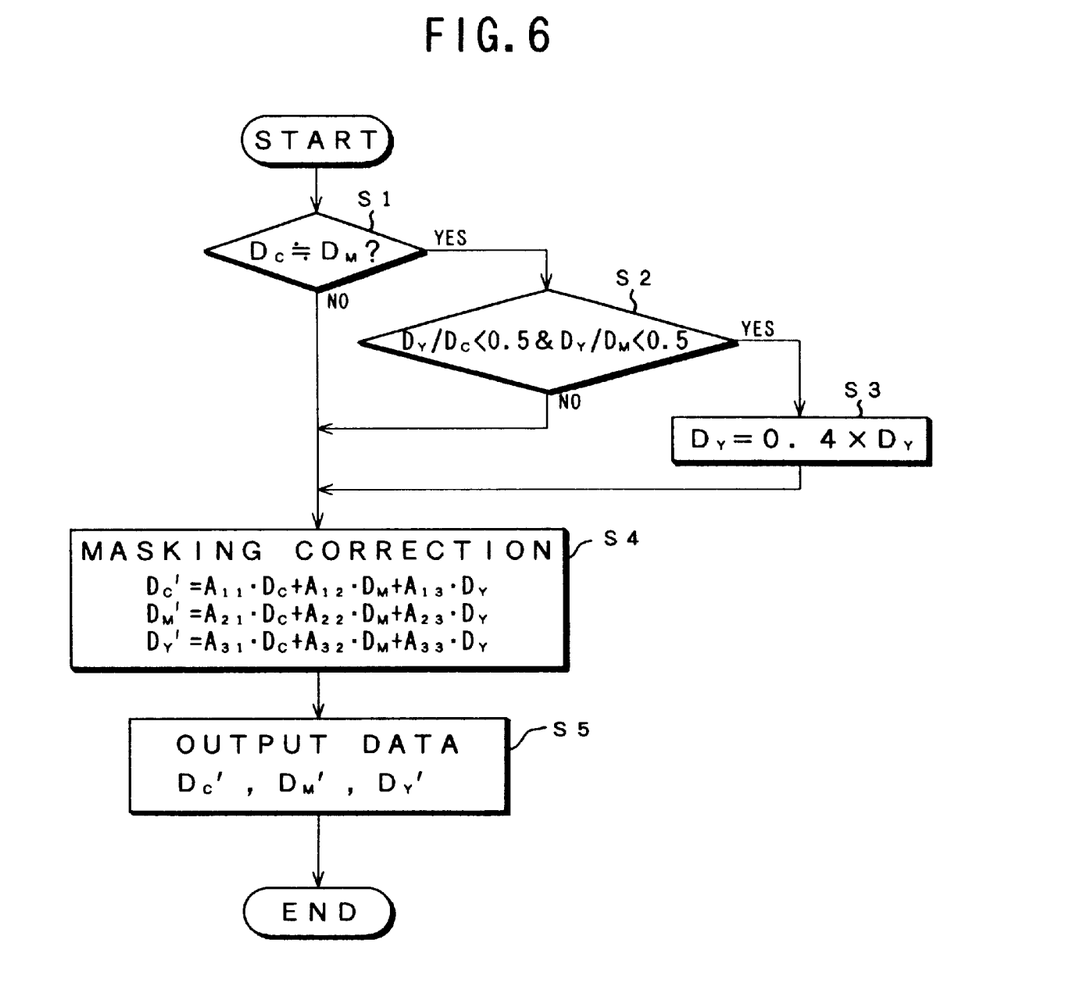
FIG. 6 is an exemplary flow chart of a color correction according to the invention.

FIG. 6 is a flow chart of the above color correction.

The flow chart shown in FIG. 6 is implemented to extract a blue image data based on the density balance of the input image data of C-, M-, Y-components and to reduce the density level of Y-components of the extracted blue image data substantially by 50%.

The image data of C-, M-, Y-components input in time series from the scanner 2 are input to the color correcting circuit 103 after specified image processings are applied thereto in the input processing circuit 101 and the image discriminating circuit 102, and are then subjected to the color correction performed in accordance with the flow chart of FIG. 6.

First, it is discriminated whether the density level $D_C$ of the C-components and the density level $D_M$ of the M-components are substantially identical (Step S1). If these density levels substantially differ ($D_C \neq D_M$), Step S4 follows upon the determination that the color in this pixel position is neither blue nor black.

On the other hand, if $D_C \approx D_M$, it is further discriminated whether a ratio ($D_Y/D_C$) of the density level of the Y-components to that of the C-components and a ratio ($D_Y/D_M$) of the density level of the Y-components to that of the M-components satisfy relationships ($D_Y/D_C$)<0.5 and ($D_Y/D_M$)<0.5 (Step S2). This discrimination is made to distinguish blue from black. If the discrimination result is in the negative (NO in Step S2), Step S4 follows upon the determination that the color is not pure blue because there are relatively many Y-components. If the discrimination result is in the affirmative (YES in Step S2), the color is discriminated to be pure blue and Step S4 follows after the density level $D_Y$ of the Y-components is reduced to $0.4 \cdot D_Y$ (Step S3).

Although a correction coefficient $K_B$ to multiply the density level $D_Y$ of the Y-components is set at 0.4 in this embodiment, the correction coefficient $K_B$ is theoretically or empirically set on the basis of the spectral characteristics of the toner and those of the color filters of the CCD 94.

In Step S4, the density levels $D_C$, $D_M$, $D_Y$ (or 0.4 $D_Y$) of the image data of C-, M-, Y-components are converted into density levels $D_C'$, $D_M'$, $D_Y'$ in accordance with the masking equations determined by the correction coefficients $A_{1j}$, $A_{2j}$, $A_{3j}$ (j=1,2,3) according to the density levels of the respective color components as shown in TABLE-1 (second color correction). Then, the image data having the converted density levels are output to the output color selecting circuit 104 (Step S5).

Next, the color deviation correction of Y-colors of the example No. 3 is described.

Figure 7:
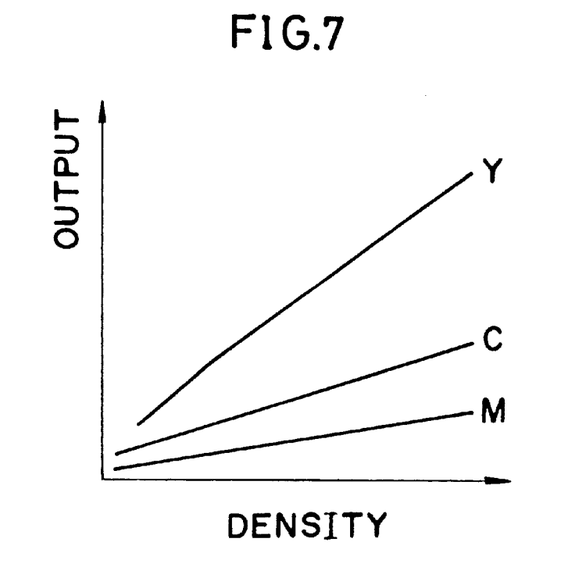
FIG. 7 is a graph showing exemplary output characteristics of C-, M-, Y-components of an image data obtained by reading a red-tinted yellow image by a color scanner.
Figure 8:
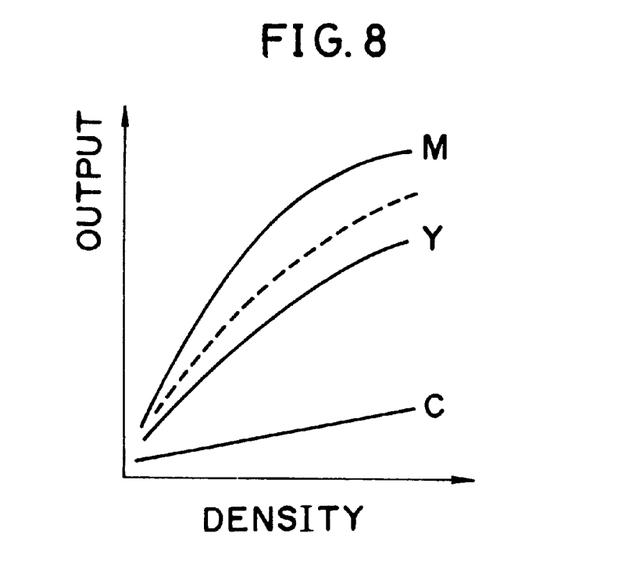
FIG. 8 is a graph showing exemplary output characteristics of C-, M-, Y-components of an image data obtained by reading a red image by a color scanner.

FIG. 7 is a graph showing exemplary output characteristics of C-, M-, Y-components of an image data obtained by reading a red-tinted yellow image by a color scanner, and FIG. 8 is a graph showing exemplary output characteristics of C-, M-, Y-components of an image data obtained by reading a red image by a color scanner.

In pure red, the image data of M- and Y-components make a steep change in a low density region as shown in FIG. 8. The color needs to be made yellowish in the low density region in view of the color reproducibility. Thus, by the masking, the slope of the curve representing the M-components is made less steep as indicated by dotted line in FIG. 8.

However, in the case of the red-tinted yellow image, the above processing makes the level of the M-components even lower in the low density region, making it impossible to reproduce the red tint of yellow. Accordingly, in this case, the density level of the input M-components is increased. Specifically, if the density balance is such that a ratio ($D_M/D_Y$) of the density level of the M-components to that of the Y-components and the ratio ($D_C/D_Y$) of the density level of the C-components to that of the Y-components satisfy relationships ($D_M/D_Y$)<0.7 and ($D_C/D_Y$)<0.1, the density level of the M-components is increased to $1.4 \cdot D_M$.

In this case, the color correction can be performed in accordance with a flow chart in which Step S1 is deleted from the flow chart of FIG. 6 and the contents of Steps S2 and S3 are changed to "$D_M/D_Y<0.7$ & $D_C/D_Y<0.1$" and "$D_M=1.4\times D_M$", respectively.

For the specific chromatic colors, the color reproducibility can be improved by increasing or reducing the image data of partial color components as described above. However, in the case of gray, the density level of the C-, M-, Y-components are input in a well-balanced manner. Accordingly, if the color correction is performed to the input image data in accordance with the masking equations for the chromatic colors, the density levels $D_{C'}$, $D_{M'}$, $D_{Y'}$ of the C-, M-, Y-components lose their balance, thereby deteriorating the color reproducibility of gray. Accordingly, in the case of gray, the color correction is performed in accordance with masking equations having correction coefficients specially set for gray.

Specifically, the image data of C-, M-, Y-components constituting gray are extracted in accordance with color discrimination equations below, and the color correction is applied to these image data in accordance with special masking equations (3).

Color Discrimination Equations (1) Discrimination equation for gray in the C-components $$0.7<D_C/D_M<1.4 \text{ \& } 0.7<D_C/D_Y<1.4$$

(2) Discrimination equation for gray in the M-components $$0.7<D_M/D_C<1.4 \text{ \& } 0.7<D_M/D_Y<1.4$$

(3) Discrimination equation for gray in the Y-components $$0.7<D_Y/D_M<1.4 \text{ \& } 0.7<D_Y/D_C<1.4$$

TABLE 3

| No | DENSITY LEVEL | MASKING EQUATIONS |
|---|---|---|
| 1 | 0–100 | $D_{C'} = 0.85 \cdot D_C - 0.02 \cdot D_M - 0.02 \cdot D_Y$ |
|   |   | $D_{M'} = -0.20 \cdot D_C + 0.90 \cdot D_M - 0.09 \cdot D_Y$ |
|   |   | $D_{Y'} = -0.08 \cdot D_C - 0.08 \cdot D_M + 0.70 \cdot D_Y$ |
| 2 | 101–150 | $D_{C'} = 0.87 \cdot D_C - 0.13 \cdot D_M - 0.10 \cdot D_Y$ |
|   |   | $D_{M'} = -0.17 \cdot D_C + 0.92 \cdot D_M - 0.10 \cdot D_Y$ |
|   |   | $D_{Y'} = -0.15 \cdot D_C - 0.15 \cdot D_M + 0.81 \cdot D_Y$ |
| 3 | 151–190 | $D_{C'} = 0.90 \cdot D_C - 0.20 \cdot D_M + 0.00 \cdot D_Y$ |
|   |   | $D_{M'} = -0.15 \cdot D_C + 0.92 \cdot D_M - 0.00 \cdot D_Y$ |
|   |   | $D_{Y'} = -0.05 \cdot D_C - 0.10 \cdot D_M + 0.98 \cdot D_Y$ |
| 4 | 191–255 | $D_{C'} = 0.97 \cdot D_C - 0.20 \cdot D_M + 0.00 \cdot D_Y$ |
|   |   | $D_{M'} = -0.15 \cdot D_C + 0.90 \cdot D_M - 0.00 \cdot D_Y$ |
|   |   | $D_{Y'} = -0.00 \cdot D_C - 0.20 \cdot D_M + 0.95 \cdot D_Y$ |

Accordingly, if the density balance is such that the ratio $(D_M/D_Y)$ and the ratio $(D_C/D_Y)$ satisfy relationships $0.7<(D_M/D_C)<1.4$, $0.7<(D_M/D_Y)<1.4$ and the density level $D_C$ of the C-components lies in the range of 0–100, the color made up of the C-, M- and Y-components is discriminated to be gray, and the image data of the respective color components are subjected to the color correction in accordance with the masking equations of No. 1 of TABLE-3, instead of the masking equations (3).

Since the color deviation is corrected only for the specific colors of the original image in this embodiment, the tone becomes discontinuous in the vicinity of the color whose deviation has been corrected. This may cause an unnatural color variation and pseudo outlines. In such a case, a color correction may be performed so as to make the discontinuous portion of the tone as continuous as possible by varying the correction coefficients of the masking equations as disclosed in Japanese Unexamined Patent Publication No. 6-113126.

Although the invention is described with respect to the color copier in the above embodiment, it is not limited to that. The invention is applicable to a color scanner, a color printer and an image processing system combined with a computer.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A color correcting device for applying a color correction to image data made up of color components of three primary colors and read by a color image reader means, comprising:

image data extraction means for extracting image data of a predetermined color to be corrected from said image data based on a density balance of the color components of the three primary colors of the extracted image data;

the color components of the three primary colors being a cyan color component, a magenta color component and a yellow color component;

correction means for correcting a density level of a specified color component, specified in accordance with the predetermined color to be corrected, out of the color components of the extracted image data, by setting the density level of the specified color component to a corrected density level; and the image data extraction means extracting blue image data as the image data of the predetermined color to be corrected, and the correction means reducing a density level of said yellow color component as the specified color component of the blue image data to said corrected density level.

2. The color correcting device according to claim 1, further comprising storage means for storing correction coefficients set in advance for said predetermined color to be corrected, wherein the correction means sets the density level to the corrected density level by multiplying the density level of the specified color component of the color to be corrected by one of said correction coefficients.

3. A color correcting device for applying a color correction to image data made up of color components of three primary colors and read by a color image reader means, comprising:

image data extraction means for extracting image data of a predetermined color to be corrected from said image data based on a density balance of the color components of the three primary colors of the extracted image data;

the color components of the three primary colors being a cyan color component, a magenta color component and a yellow color component;

correction means for correcting a density level of a specified color component, specified in accordance with the predetermined color to be corrected, out of the color components of the extracted image data, by setting a density level of the specified color component to a corrected density level; and the image data extraction means extracting yellow image data as the image data of the predetermined color to be corrected, and the correction means increasing a density level of said magenta color component as the specified color component of the yellow image data to said corrected density level.

4. The color correcting device according to claim 3, further comprising storage means for storing correction coefficients set in advance for said predetermined color to be corrected, wherein the correction means sets the density level to the corrected density level by multiplying the density level of the specified color component of the color to be corrected by one of said correction coefficients.

5. A color correcting device for applying a color correction to image data made up of color components of three primary colors and read by a color image reader means, comprising:

image data extraction means for extracting image data of a predetermined color to be corrected from said image data based on a density balance of the color components of the three primary colors of the extracted image data;

the color components of the three primary colors being a cyan color component, a magenta color component and a yellow color component;

correction means for correcting a density level of a specified color component, specified in accordance with the predetermined color to be corrected, out of the color components of the extracted image data, by setting a density level of the specified color component to a corrected density level; and the image data extraction means extracting green image data as the image data of the predetermined color to be corrected, and the correction means increasing a density level of said magenta component as the specified color component of the green image data to said corrected density level.

6. The color correcting device according to claim 5, further comprising storage means for storing correction coefficients set in advance for said predetermined color to be corrected, wherein the correction means sets the density level to the corrected density level by multiplying the density level of the specified color component of the color to be corrected by one of said correction coefficients.

7. A color correcting device for applying a color correction to image data made up of color components of three primary colors and read by a color image reader means, comprising:

image data extraction means for extracting image data of a predetermined color to be corrected from said image data based on a density balance of the color components of the three primary colors of the extracted image data;

the color components of the three primary colors being a cyan color component, a magenta color component and a yellow color component;

correction means for correcting a density level of a specified color component, specified in accordance with the predetermined color to be corrected, out of the color components of the extracted image data, by setting a density level of the specified color component to a corrected density level; and the image data extraction means extracting cyan image data as the image data of the predetermined color to be corrected, and the correction means reducing a density level of said magenta color component as the specified color component of the cyan image data to said corrected density level.

8. The color correcting device according to claim 7, further comprising storage means for storing correction coefficients set in advance for said predetermined color to be corrected, wherein the correction means sets the density level to the corrected density level by multiplying the density level of the specified color component of the color to be corrected by one of said correction coefficients.

9. A color correction device for applying a color correction to image data made up of color components of three primary colors and read by a color image reader means, comprising:

image data extraction means for extracting image data of a predetermined color to be corrected from said image data based on a density balance of the color components of the three primary colors of the extracted image data;

the color components of the three primary colors being a cyan color component, a magenta color component and a yellow color component;

correction means for correcting a density level of a specified color component, specified in accordance with the predetermined color to be corrected, out of the color components of the extracted image data, by setting a density level of the specified color component to a corrected density level; and the image data extraction means extracting cyan image data as the image data of the predetermined color to be corrected, and the correction means increasing a density level of said yellow color component as the specified color component of the cyan image data to said corrected density level.

10. The color correcting device according to claim 9, further comprising storage means for storing correction coefficients set in advance for said predetermined color to be corrected, wherein the correction means sets the density level to the corrected density level by multiplying the density level of the specified color component of the color to be corrected by one of said correction coefficients.

11. A color correcting device for applying a color correction in accordance with specified masking equations to image data made up of color components of three primary colors and read by a color image reader means, comprising:

storage means for storing first masking equations having first correction coefficients for making a color correction of image data of gray color and second masking equations having second correction coefficients for making a color correct of image data other than the gray color;

color discriminations means for discriminating based on a density balance of the color components of three primary colors whether the color of the image data is the gray color; and color correction control means for applying the color correction in accordance with the first masking equations to the image data, if the discriminated color is the gray color while applying the color correction in accordance with the second masking equations to the image data unless the discriminated color is the gray color.

12. The color correcting device according to claim 11, wherein the color components of the three primary colors are cyan color component, a magenta color component and a yellow color component.

13. A color correcting device for correcting image data which is read by a color image reader having color filters, includes color components corresponding to three primary colors and is to be used to control application of toners to print an image, the color correcting device comprising:

image data extraction means for extracting image data of at least one predetermined color type from said image data based on at least a ratio of density levels of at least two of said color components;

first color component correction means for correcting a density level of at least one predetermined color component of said color components of the extracted image data by setting said density level of said at least one predetermined color component to a corrected density level which compensates for spectral characteristics of one of said color filters associated with said at least one predetermined color type, said at least one predetermined color component being specified for said predetermined color type; and second color component correction means for converting density levels of said color components of said at least one predetermined color type, including said at least one predetermined color component set to said corrected density level, to converted density levels using a set of masking equations having a masking equation corresponding to each of said color components with coefficients selected based on a density level of a corresponding one of said color components of said at least one predetermined color type, including said at least one predetermined color component set to said corrected density level, and operating on said color components of said at least one predetermined color type, including said at least one predetermined color component set to said corrected density level, to compensate for toner characteristics.

14. The color correcting device of claim 13 wherein:

said color components corresponding to said three primary colors are a cyan color component, a magenta color component and a yellow color component;

said image data extraction means extracts blue image data as said image data of said predetermined color to be corrected; and said first color component correction means reduces a density level of said yellow color component as said at least one predetermined color component of said blue image data to said corrected density level.

15. The color correcting device of claim 14 wherein said image data extraction means extracts said blue image data as said image data of said predetermined color to be corrected by determining that image data is said blue image data when:

a density level of said cyan color component is approximately equal to a density level of said magenta color component;

a ratio of said density level of said yellow color component to said density level of said magenta color component is less than 0.5; and a ratio of said density level of said yellow color component to said density level of said cyan color component is less than 0.5.

16. The color correcting device according to claim 15, further comprising said first color component correction means including storage means for storing correction coefficients set in advance for said predetermined color to be corrected, wherein the correction means sets the density level to the corrected density level by multiplying the density level of said yellow color component by one of said correction coefficients which is less than one.

17. The color correcting device according to claim 16, wherein said one of said correction coefficients is equal to about 0.5.

18. The color correcting device according to claim 14, further comprising said first color component correction means including storage means for storing correction coefficients set in advance for said predetermined color to be corrected, wherein the correction means sets the density level to the corrected density level by multiplying the density level of said yellow color component by one of said correction coefficients which is less than one.

19. The color correcting device according to claim 18, wherein said one of said correction coefficients is equal to about 0.5.

20. The color correcting device of claim 13 wherein:

said color components corresponding to said three primary colors are a cyan color component, a magenta color component and a yellow color component;

said image data extraction means extracts yellow image data as said image data of said predetermined color to be corrected; and said first color component correction means increases a density level of said magenta color component as said at least one predetermined color component of said yellow image data to said corrected density level.

21. The color correcting device of claim 20 wherein said image data extraction means extracts said yellow image data as said image data of said predetermined color to be corrected by determining that image data is said yellow image data when:

a ratio of said density level of said magenta color component to said density level of said yellow color component is less than 0.7; and a ratio of said density level of said cyan color component to said density level of said yellow color component is less than 0.1.

22. The color correcting device according to claim 21, further comprising said first color component correction means including storage means for storing correction coefficients set in advance for said predetermined color to be corrected, wherein the correction means sets the density level to the corrected density level by multiplying the density level of said magenta color component by one of said correction coefficients which is greater than one.

23. The color correcting device according to claim 22, wherein said one of said correction coefficients is equal to 1.4

24. The color correcting device according to claim 20, further comprising said first color component correction means including storage means for storing correction coefficients set in advance for said predetermined color to be corrected, wherein the correction means sets the density level to the corrected density level by multiplying the density level of said magenta color component by one of said correction coefficients which is greater than one.

25. The color correcting device according to claim 24, wherein said one of said correction coefficients is equal to 1.4

26. The color correcting device of claim 13 wherein:

said color components corresponding to said three primary colors are a cyan color component, a magenta color component and a yellow color component;

said image data extraction means extracts green image data as said image data of said predetermined color to be corrected; and said first color component correction means increases a density level of said magenta color component as said at least one predetermined color component of said green image data to said corrected density level.

27. The color correcting device of claim 26 wherein said image data extraction means extracts said green image data as said image data of said predetermined color to be corrected by determining that image data is said green image data when:

a ratio of said density level of said magenta color component to said density level of said cyan color component is less than 0.4; and a ratio of said density level of said magenta color component to said density level of said yellow color component is less than 0.4.

28. The color correcting device according to claim 27, further comprising said first color component correction means including storage means for storing correction coefficients set in advance for said predetermined color to be corrected, wherein the correction means sets the density level to the corrected density level by multiplying the density level of said magenta color component by one of said correction coefficients which is greater an one.

29. The color correcting device according to claim 28, wherein said one of said correction coefficients is equal to 1.4

30. The color correcting device according to claim 26, further comprising said first color component correction means including storage means for storing correction coefficients set in advance for said predetermined color to be corrected, wherein the correction means sets the density level to the corrected density level by multiplying the density level of said magenta color component by one of said correction coefficients which is greater than one.

31. The color correcting device according to claim 30, wherein said one of said correction coefficients is equal to 1.4.

32. The color correcting device of claim 13 wherein:

said color components corresponding to said three primary colors are a cyan color component, a magenta color component and a yellow color component;

said image data extraction means extracts cyan image data as said image data of said predetermined color to be corrected; and said first color component correction means reduces a density level of said magenta color component as said at least one predetermined color component of said cyan image data to said corrected density level.

33. The color correcting device of claim 32 wherein said image data extraction means extracts said cyan image data as said image data of said predetermined color to be corrected by determining that image data is said cyan image data when a ratio of said density level of said magenta color component to said density level of said cyan color component is less than 0.6.

34. The color correcting device according to claim 33, further comprising said first color component correction means including storage means for storing correction coefficients set in advance for said predetermined color to be corrected, wherein the correction means sets the density level to the corrected density level by multiplying the density level of said magenta color component by one of said correction coefficients which is less than one.

35. The color correcting device according to claim 34, wherein said one of said correction coefficients is equal to 0.3.

36. The color correcting device according to claim 32, further comprising said first color component correction means including storage means for storing correction coefficients set in advance for said predetermined color to be corrected, wherein the correction means sets the density level to the corrected density level by multiplying the density level of said magenta color component by one of said correction coefficients which is less than one.

37. The color correcting device according to claim 36, wherein said one of said correction coefficients is equal to 0.3.

38. The color correcting device of claim 13 wherein:

said color components corresponding to said three primary colors are a cyan color component, a magenta color component and a yellow color component;

said image data extraction means extracts cyan image data as said image data of said predetermined color to be corrected; and said first color component correction means increases a density level of said yellow color component as said at least one predetermined color component of said cyan image data to said corrected density level.

39. The color correcting device of claim 38 wherein said image data extraction means extracts said cyan image data as said image data of said predetermined color to be corrected by determining that image data is said cyan image data when a ratio of said density level of said yellow color component to said density level of said cyan color component is less than 0.6.

40. The color correcting device according to claim 39, further comprising said first color component correction means including storage means for storing correction coefficients set in advance for said predetermined color to be corrected, wherein the correction means sets the density level to the corrected density level by multiplying the density level of said yellow color component by one of said correction coefficients which is greater than one.

41. The color correcting device according to claim 40, wherein said one of said correction coefficients is equal to 1.4.

42. The color correcting device according to claim 38, further comprising said first color component correction means including storage means for storing correction coefficients set in advance for said predetermined color to be corrected, wherein the correction means sets the density level to the corrected density level by multiplying the density level of said yellow color component by one of said correction coefficients which is greater than one.

43. The color correcting device according to claim 42, wherein said one of said correction coefficients is equal to 1.4.

* * * * *